United States Patent [19]
Dubin et al.

[11] 3,933,523
[45] Jan. 20, 1976

[54] SOLID SODIUM ION-CONDUCTIVE ELECTROLYTE WITH LIQUID METALLIC LAYER

[75] Inventors: Robert R. Dubin, Schenectady; Fritz G. Will, Scotia; William L. Mowrey, Burnt Hills, all of N.Y.

[73] Assignee: General Electric Company, Schenectady, N.Y.

[22] Filed: Feb. 24, 1975

[21] Appl. No.: 552,556

Related U.S. Application Data

[63] Continuation of Ser. No. 451,965, March 18, 1974, abandoned.

[52] U.S. Cl. .................. 136/6 FS; 136/20; 136/153
[51] Int. Cl.² ......................................... H01M 43/06
[58] Field of Search ............ 136/6 FS, 6 L, 6 R, 20, 136/83 R, 100 R, 153

[56] References Cited
UNITED STATES PATENTS

| | | | |
|---|---|---|---|
| 3,503,808 | 3/1970 | Agruss et al. ..................... | 136/83 R |
| 3,793,080 | 2/1974 | Hess................................. | 136/83 R |
| 3,826,685 | 7/1974 | Dubin et al. ...................... | 136/20 X |

Primary Examiner—Anthony Skapars
Attorney, Agent, or Firm—Paul R. Webb, II; Joseph T. Cohen; Jerome C. Squillaro

[57] ABSTRACT

A composite article consists of a solid sodium ion-conductive material, and a liquid mercury-indium alloy layer adhering intimately to one major surface of the material. Suitable mercury-indium alloys include mercury-indium, mercury-indium-thallium, mercury-sodium-indium, and mercury-sodium-indium-thallium.

7 Claims, 4 Drawing Figures

SOLID SODIUM ION-CONDUCTIVE ELECTROLYTE WITH LIQUID METALLIC LAYER

This is a continuation of application Ser. No. 451,965 filed Mar. 18, 1974, now abandoned.

This invention relates to solid sodium ion-conductive electrolytes and, more particularly, to such electrolytes with a liquid metallic layer on one surface thereof.

Solid sodium ion-conductive electrolytes are useful in sodium-sulfur and sodium-halogen cells and batteries. Sodium-sulfur cells, which operate at elevated temperatures, are known in the prior art as, for example, described in Kummer et al U.S. Pat. No. 3,404,036 issued Oct. 1, 1968 under the title "Energy Conversion Device Comprising a Solid Crystalline Electrolyte and a Solid Reaction Zone Separator". The solid crystalline ion-conductive electrolyte in the above-mentioned sodium-sulfur battery can be sodium beta-alumina. Such electrolytes are shown as containers in Kummer et al U.S. Pat. No. 3,404,035 and are shown as tubes in Kummer et al U.S. Pat. No. 3,413,150. Such electrolytes are employed in sodium-halogen batteries, for example, as described in Hess U.S. Pat. No. 3,793,080 issued Feb. 19, 1974.

The frequently observed unsatisfactory performance of cells and batteries employing a sodium containing reactant and a solid sodium ion-conductive electrolyte results from a large polarization occuring at the sodium and electrolyte interface. This large interfacial polarization results from the poor wetting characteristics of liquid sodium or liquid sodium mercury amalgam in contact with the untreated electrolyte surface.

Our present invention is directed to overcoming the above problems by providing a composite article consisting of a liquid metallic layer on one major surface of a solid sodium ion-conductive electrolyte. When our improved composite article is employed in a cell including a sodium containing reactant, the liquid metallic layer is in contact with the sodium containing reactant resulting in substantially improved wetting at the sodium and electrolyte interface.

The primary object of our invention is to provide an improved composite article for a cell utilizing a sodium containing reactant.

In accordance with one aspect of our invention, a composite article consists of a solid sodium ion-conductive electrolyte, and a liquid mercury-indium alloy layer adhering intimately to one major surface of the electrolyte.

These and various other objects, features and advantages of the invention will be better understood from the following description taken in connection with the accompanying drawing in which.

Figure 1:
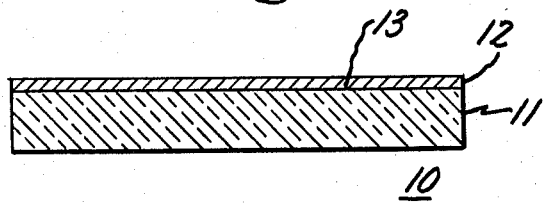
FIG. 1 is a sectional view of a composite article made in accordance with our invention.

In FIG. 1 of the drawing, there is shown generally at 10 an improved composite article embodying our invention. Composite article 10 consists of solid ion-conductive material 11 formed in the shape of a disc, and a liquid mercury-indium alloy layer 12 adhering intimately to one major surface 13 of disc 11.

Figure 2:
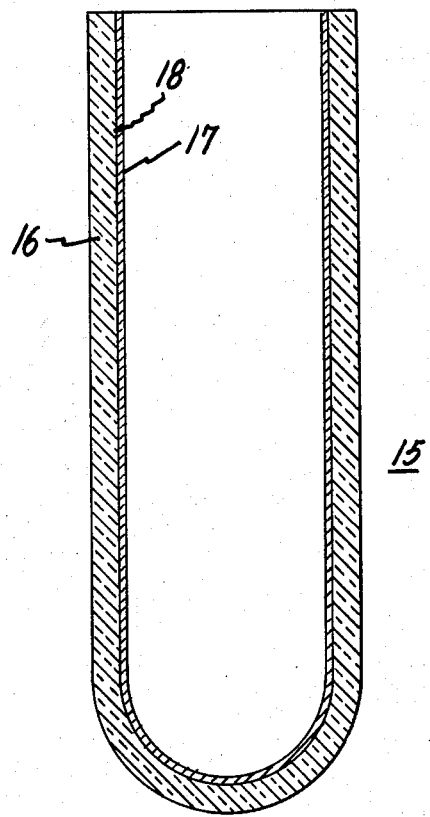
FIG. 2 is a sectional view of another composite article made in accordance with our invention.

In FIG. 2 of the drawing, there is shown generally at 15 another improved solid sodium ion-conductive electrolyte embodying our invention. Electrolyte 15 consists of a solid ion-conductive material 16 formed in the shape of a closed end tube, and a liquid mercury-indium alloy layer 17 adhering to one major surface 18, the interior surface, of tube 16.

We found that we could form an improved composite article by providing a solid sodium ion-conductive electrolyte in a configuration such as a disc or a tube. Such electrolyte material is formed into a disc or tube in a conventional manner. We found that we could adhere intimately a liquid mercury-indium alloy layer on one major surface of the electrolyte disc, tube or other configuration. We found that we could obtain intimate adherence or wetting of the alloy with electrolyte surface by applying the alloy on the electrolyte surface and rubbing the alloy onto the surface. The alloy layer is generally from 1.0 to 100.0 microns in thickness. Such alloys include mercury-indium, mercury-indium-thallium, mercury-sodium-indium and mercury-sodium-indium-thallium alloys. The mercury-indium alloy contains from 40 to 99 weight percent mercury and from 1 to 60 weight percent indium. The preferred alloy contains 60 weight percent mercury and 40 weight percent indium. The mercury-indium-thallium alloy contains from 40 to 98.9 weight percent mercury, from 1 to 59 weight percent indium, and from 0.1 to 1.0 weight percent thallium. The preferred alloy contains 56.0 weight percent mercury, 43.8 weight percent indium, and 0.2 weight percent thallium. The mercury-sodium-indium alloy contains from 85.0 to 99.998 weight percent of sodium and mercury, and from 0.002 to 15.0 weight percent indium. The mercury-sodium-indium-thallium alloy contains from 84.85 to 99.997 weight percent of sodium and mercury, from 0.002 to 15.0 weight percent indium, and from an amount of less than 0.001 to 0.15 weight percent thallium.

The above preferred alloy of 56.0 weight percent mercury-43.8 weight percent indium-0.2 weight percent thallium is available commercially as Viking LS232 liquid metal alloy from Elmat Corporation, 1271 Terra Bella Avenue, Mountain View, California 74041. In a four page booklet entitled "Report No. LA-100-63" without date which is available from the above company, it is set forth that this alloy has the unique ability to "wet" virtually all materials — nonmetallic as well as metallic — to form contacts of very low electrical and thermal resistance. Further, it is set forth that typical materials wet by this alloy include ceramics of barium titanate, lead-zirconium titanate and ferrites and glass of boron, Pyrex, Vycor, quartz fiber glass and arsenic.

The subject report fails completely to disclose, suggest or teach applicants' invention as described and claimed in the present application.

We found that various solid sodium ion-conductive electrolytes are usable in our invention. We prefer to employ sodium beta-alumina.

We found unexpectedly that our composite article was useful in a cell using a sodium containing reactant whereby improved cell performance resulted therefrom. Previous untreated beta-alumina electrolyte often exhibited unsatisfactory cell performance resulting from a large polarization occurring at the sodium or sodium mercury amalgam and electrolyte interface. Such large interfacial polarization resulted from the poor wetting characteristics of the liquid sodium or liquid sodium mercury amalgam in contact with the untreated electrolyte surface.

Our improved composite article improves the wetting characteristics of the liquid sodium reactant and the beta-alumina surface in intimate contact with the mercury-indium layer. This improved wetting is employed advantageously in a cell whereby performance is improved. The beneficial effects of the alloy layer are maintained during cell operation from ambient to about 350°C temperature. The effect is more pronounced at the lower end of the temperature range.

Figure 3:
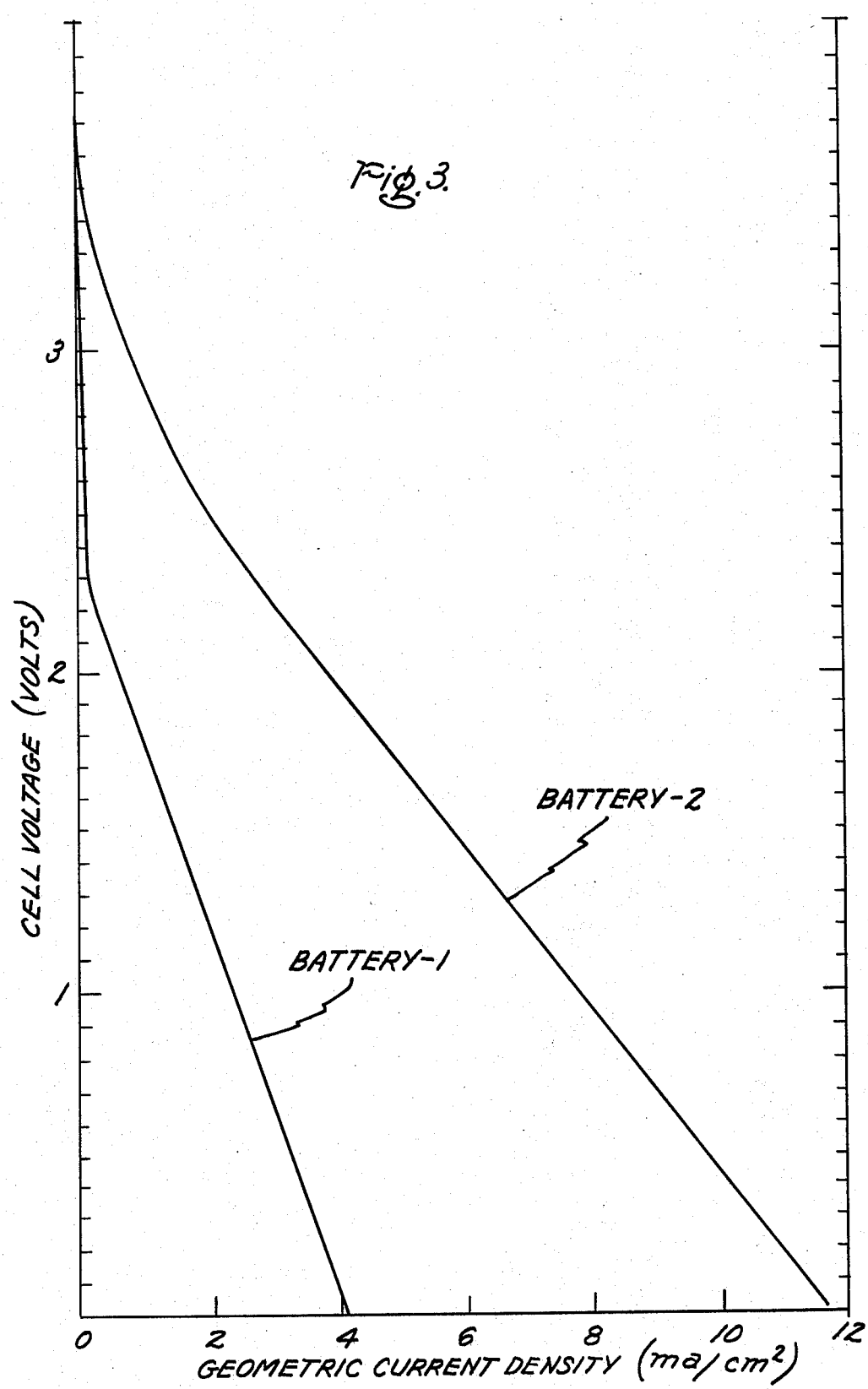
FIG. 3 is a graph plotting cell voltage in volts versus geometric current density in milliamperes per square centimeter comparing batteries with and without the improved composite article of the present invention.
Figure 4:
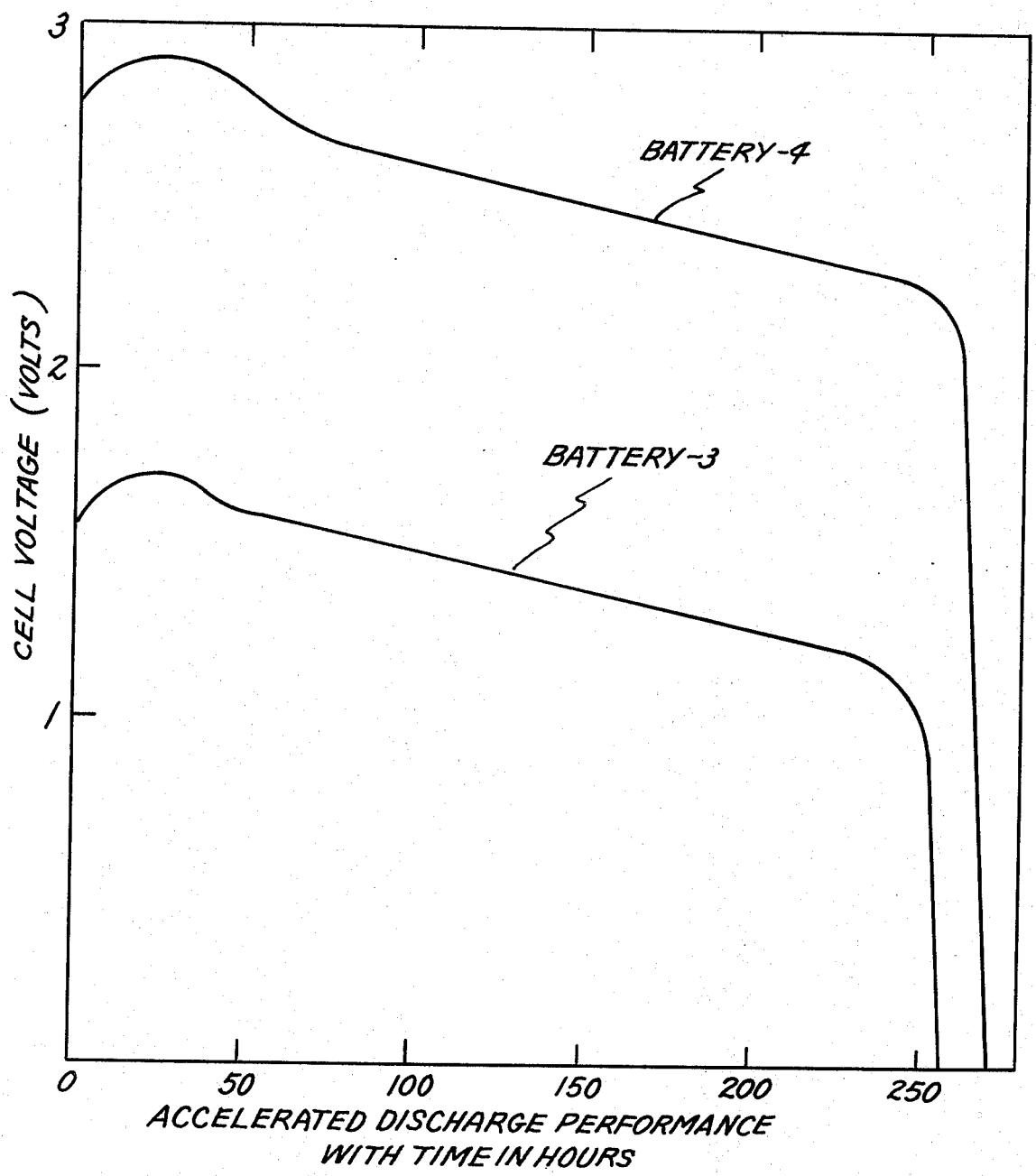
FIG. 4 is a graph plotting cell voltage in volts versus time in hours for an accelerated discharge comparing batteries identical to the batteries compared in FIG. 3.

The unexpected beneficial effect of employing our improved electrolyte is shown in FIGS. 3 and 4. FIG. 3 is a graph plotting cell voltage in volts vs. geometric current density comparing the initial performance of batteries 1 and 2. Each of these batteries had a glass casing with a sodium beta-alumina electrolyte dividing the casing into a cathode compartment and an anode compartment. In the anode compartment is an anode of sodium mercury amalgam with 70 weight percent sodium and 30 weight percent mercury. In the cathode compartment is a cathode of 0.5M iodine and 1.0M sodium iodide in propylene carbonate. The difference between the batteries is that battery 2 includes our improved composite article which has a liquid mercury-indium alloy layer of 56.0 weight percent mercury-43.8 weight percent indium-0.2 weight percent thallium adhering intimately to the major surface of the electrolyte adjacent to and in contact with the anode. As it is seen from FIG. 3, the second battery with the improved electrolyte having a liquid metallic alloy layer showed initial threefold improvement in battery performance.

FIG. 4 is a graph plotting cell voltage in volts vs. time in hours for an accelerated rate of discharge comparing batteries 3 and 4, which are identical to batteries 1 and 2 discussed above. As it is seen from FIG. 4, battery 4 exhibits its sustained superior performance throughout its entire discharge period as compared to battery 3.

Examples of composite articles made in accordance with our invention are set forth below.

EXAMPLE I

A composite article was constructed generally in accordance with the above description and with FIG. 1 of the drawing. A disc of solid ion-conductive material of sodium beta-alumina was provided on one major surface thereof with a liquid mercury-indium alloy layer. This layer consisted of 56 weight percent mercury, 43.8 weight percent indium and 0.2 weight percent thallium. The alloy layer was applied to one major surface of the electrolyte material and rubbed thereon resulting in the alloy layer adhering intimately to the one major surface of the electrolyte material. The resulting structure was a composite article made in accordance with our invention.

EXAMPLE II

A composite article was made in accordance with the above description in Example I except that the layer was applied by rubbing to the interior surface of sodium beta-alumina as shown in FIG. 2 of the drawing.

EXAMPLE III

A composite article was made as described above in Example I except that the composition of the alloy was 60 weight percent mercury and 40 weight percent indium.

EXAMPLE IV

A composite article was made in accordance with Example III above except that the mercury-indium layer was applied to the interior surface of a tube of sodium beta-alumina as shown above in FIG. 2.

EXAMPLE V

A vented battery was constructed which employed a glass casing, which casing was separated by the improved composite article of Example I. The composite article divided the casing into a cathode and an anode compartment. The composite article consisted of a solid sodium beta-alumina electrolyte with a layer of an alloy of 56.0 weight percent mercury, 43.8 weight percent indium and 0.2 weight percent thallium adhering intimately to the major surface of the electrolyte adjacent to and in contact with the anode. The anode consisted of 60 weight percent sodium and 40 weight percent mercury as an amalgam. The cathode consisted of liquid bromine in an electrically conductive carbon felt material.

Another battery was constructed similar to the above battery except that no liquid mercury-indium-thallium alloy layer was applied to the surface of the electrolyte facing and in contact with the cathode.

The battery without our improved composite article is shown as battery No. 1 while our improved battery is shown as battery No. 2 in FIG. 3 of the drawing. As will be seen from FIG. 3 of the drawing, battery No. 2 with our improved electrolyte showed a threefold initial improvement in performance.

EXAMPLE VI

Two additional batteries were prepared in the same manner as the batteries in Example V. The battery without our improved composite article is labeled battery No. 3 while the battery with our improved composite article is labeled battery No. 4. FIG. 4 of the drawing shows that battery No. 4 with our improved composite article exhibited sustained superior performance throughout the entire discharge period as compared to the battery without our improved composite article.

While other modifications of the invention and variations thereof which may be employed within the scope of the invention have not been described, the invention is intended to include such as may be embraced within the following claims.

What we claim as new and desire to secure by Letters Patent of the United States is:

1. A composite article consisting of a solid sodium ion-conductive electrolyte, and a liquid mercury-indium alloy layer adhering intimately to one major surface of the electrolyte.

2. A composite article as in claim 1, in which the mercury is present from 40.0 to 99.0 weight percent, and the indium is present from 1.0 to 60.0 percent.

3. A composite article consisting of a solid sodium ion-conductive electrolyte, and a liquid mercury-indium-thallium layer adhering intimately to one major surface of the electrolye, in which mercury is present from 40.0 to 98.9 weight percent, the indium is present from 1 to 59 weight percent, and thallium is present from 0.1 to 1.0 weight percent.

4. A composite article as in claim 3, in which there is 56.0 weight percent mercury, 43.8 weight percent indium, and 0.2 weight percent thallium.

5. A composite article consisting of a solid sodium ion-conductive electrolyte, and a liquid mercury-sodium-indium alloy layer adhering intimately to one major surface of the electrolyte.

6. A composite article as in claim 5, in which the mercury and sodium are present from 85.0 to 99.998 weight percent, and the indium is present from 0.002 to 15.0 weight percent.

7. A solid sodium ion-conductive electrolyte as in claim 6, in which the mercury and sodium are present from 84.85 to 99.997 weight percent, the indium is present from 0.002 to 15.0 weight percent, and the thallium is present in an amount from less than 0.001 to 0.15 weight percent.

* * * * *